(12) United States Patent
Bass et al.

(10) Patent No.: US 6,178,462 B1
(45) Date of Patent: Jan. 23, 2001

(54) PROTOCOL FOR USING A PCI INTERFACE FOR CONNECTING NETWORKS

(75) Inventors: Brian M. Bass; Dennis Albert Doidge, both of Apex; Edward Hau-chun Ku, Cary; Scott J. Lemke, Raleigh; Joseph M. Rash, Wake Forest; Loren Blair Reiss, Raleigh, all of NC (US)

(73) Assignee: International Business Machines Corporation, Armonk, NY (US)

( * ) Notice: Under 35 U.S.C. 154(b), the term of this patent shall be extended for 0 days.

(21) Appl. No.: 08/977,230

(22) Filed: Nov. 24, 1997

(51) Int. Cl.[7] .............................. G06F 15/16; G06F 13/00
(52) U.S. Cl. .................... 709/249; 709/208; 709/209; 710/110
(58) Field of Search .................................. 709/249, 218, 709/236, 300, 250, 208, 209; 710/126, 35, 129, 128, 110

(56) References Cited

U.S. PATENT DOCUMENTS

| | | | |
|---|---|---|---|
| 5,073,852 | * 12/1991 | Siegel et al. ........................ | 709/300 |
| 5,522,050 | 5/1996 | Amini et al. ......................... | 395/306 |
| 5,550,989 | 8/1996 | Santos ................................. | 395/306 |
| 5,557,611 | 9/1996 | Cappellari et al. ................ | 370/60.1 |
| 5,564,026 | 10/1996 | Amini et al. ......................... | 395/308 |
| 5,590,377 | 12/1996 | Smith .................................. | 395/842 |
| 5,632,021 | * 5/1997 | Jennings et al. .................... | 710/129 |
| 5,768,622 | * 6/1998 | Lory et al. ........................... | 710/35 |
| 5,884,027 | * 3/1999 | Garbus et al. ...................... | 709/250 |
| 5,898,888 | * 4/1999 | Gutherie et al. .................... | 710/128 |
| 5,920,564 | * 7/1999 | Leichty et al. ...................... | 370/395 |
| 6,006,300 | * 12/1999 | Toutant ............................... | 710/126 |

FOREIGN PATENT DOCUMENTS

| | | |
|---|---|---|
| 0 769 863 A1 | 4/1997 | (EP) . |
| WO 96/27836 | 9/1996 | (WO) . |

OTHER PUBLICATIONS

"Real–Time Self–Granting, Centrally Directed Distributed Arbitration with Fairness", IBM Technical Disclosure Bulletin, vol. 38, No. 03, Mar. 1995, pp. 421–424.
$I_2O$ Technology Backgrounder, web page, available via the Internet at http://www.i2osig.org/TechBack.html, attached copy printed Sep. 10, 1997, pp. 1–6.

* cited by examiner

Primary Examiner—Glenton B. Burgess
Assistant Examiner—Quoc-Khanh Le
(74) Attorney, Agent, or Firm—John J. Timar; Winstead, Sechrest & Minick

(57) ABSTRACT

A system for coupling a local area network to a wide area network utilizes a PCI (Peripheral Component Interface) bus to couple a PCI interface to a PCI network interface card, which is coupled to the wide area network. The wide area network could be an asynchronous transfer mode network or a high bandwidth ethernet. If the PCI network interface card operates as a PCI master, then the PCI interface will operate as a PCI slave. If the PCI network interface card operates as a PCI slave, then the PCI interface of the invention will operate as a PCI master.

31 Claims, 5 Drawing Sheets

FIG. 2

| Byte 0 | | Byte 1 | | Byte 2 | | Byte 3 | | Offset in DMA Descriptor |
|---|---|---|---|---|---|---|---|---|
| 31 | 24 | 23 | 16 | 15 | 8 | 7 | 0 | |
| Control | | System Address | | | | | | 0x00 |
| | | | | Byte Count | | | | 0x04 |
| Status Update Address | | | | | | | | 0x08 |

FIG. 3

| Name | Bit Range | Description | | |
|---|---|---|---|---|
| System Address | 31-0 | This is the address in PCI address space of the start of data to move. For writes, this is the destination address and for reads it is the source address.<br><br>A System Address of x'00000000' has special meaning. A zero System Address causes the DMA engine to skip processing of the DMA descriptor, and immediately fetch the next descriptor on the DMA Descriptor Block Queue if available. | | |
| Control | 31-16 | This field contains the control information used by the DMA engine. | | |
| Control | 31-16 | 31 | Direction Bit<br>Setting this bit to 1 indicates a PCI read operation and setting it to a 0 indicates a write operation | |
| | | 30 | PCI Data Cycle Type<br>Setting this bit to a 1 indicates a PCI memory cycle and setting it to a 0 indicates a PCI I/O cycle. | |
| | | 29 | PCI Status Update Cycle Type<br>Setting this bit to a 1 indicates a PCI memory cycle and setting it to a 0 indicates a PCI I/O cycle. | |
| | | 28 | Set Interrupt on Termination<br>Setting this bit will cause an interrupt bit to be set in the interrupt register when the DMA completes. | |
| | | 27-26 | Status Update Type<br>Value    Description<br>00       No Status Update<br>01       Write System Address<br>10       Write Length/Termination status word<br>11       Reserved | |
| | | 25-16 | Reserved | |
| Byte Count | 15-0 | This is the number of bytes to transfer. | | |
| Status Update Address | 31-0 | This is the address that the status information specified in the Control field is written to. This address must be 4-byte aligned (lsb = 00). | | |

| Byte 0 | | Byte 1 | | | Byte 2 | | Byte 3 | |
|---|---|---|---|---|---|---|---|---|
| 31 | 24 | 23 | 17 | 16 | 15 | 8 | 7 | 0 |
| Reserved | | | N | E | Length | | | |

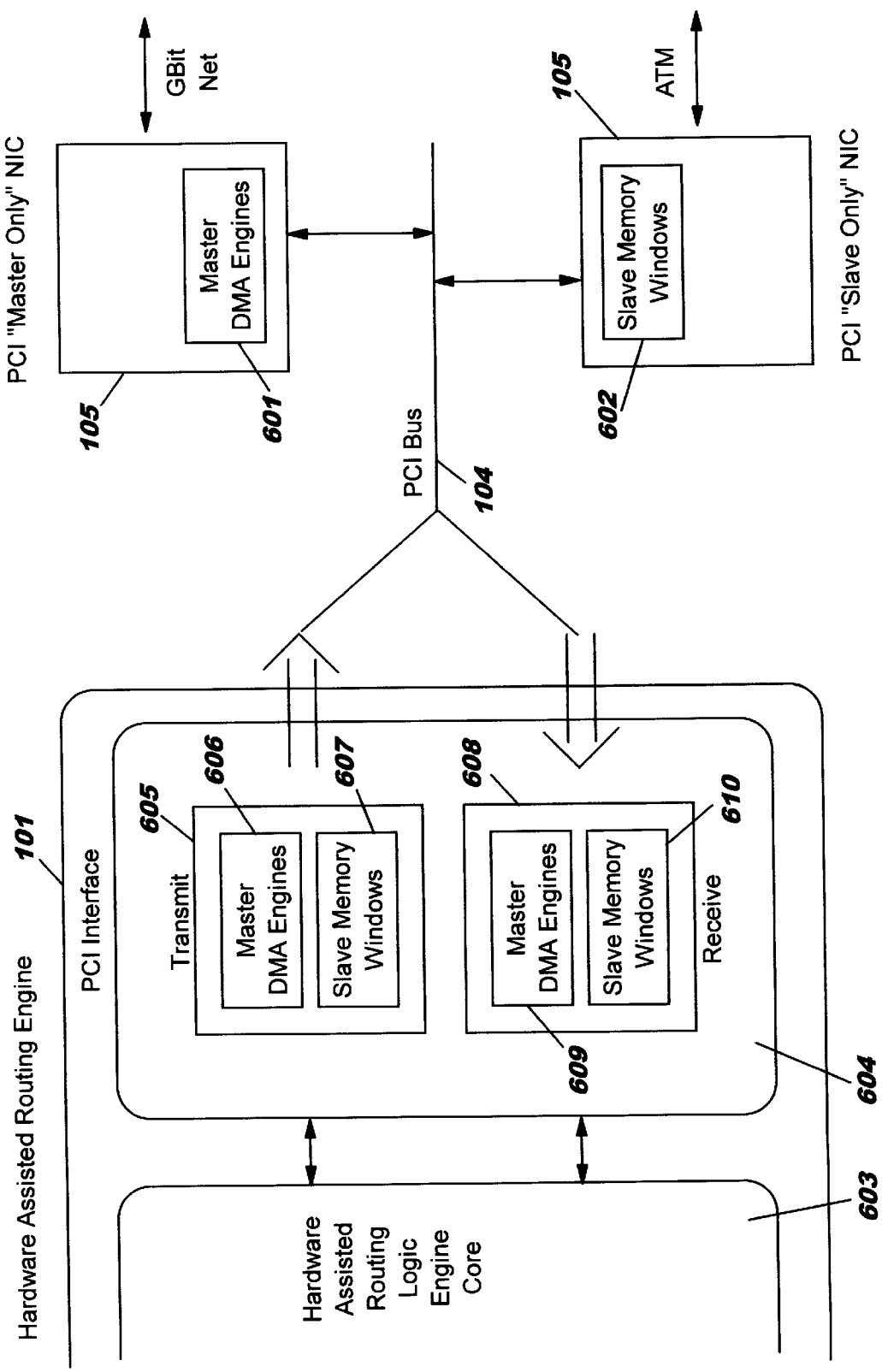

PROTOCOL FOR USING A PCI INTERFACE FOR CONNECTING NETWORKS

TECHNICAL FIELD

The present invention relates in general to interfaces between local area networks and wide area networks, and in particular, to a protocol for connecting a local area network to a wide area network.

BACKGROUND INFORMATION

Presently, numerous types of networks co-exist in the telecommunications industry, such as Local Area Networks (LANs), Wide Area Networks (WANs), X.25 Networks, Integrated Services Digital Networks (ISDNs), Asynchronous Transfer Mode (ATM) networks, and Fiber Distributed Data Interface (FDDI) networks. Because of the existence of different networks and standards, there is a need in the telecommunications industry for communication between data processing devices connected to heterogeneous networks. As an example, owners of previously installed LANs frequently want to connect to the emerging broadband ISDN or ATM networks.

Because the performance parameters of these networks continues to increase, there is a need for designing network interfaces to support more functions at the hardware level, since such a hardware design often out performs a design implemented in software. One of these functions being driven to the hardware level is network routing. There are many problems associated with performing routing in hardware. The problem addressed by the present invention is that of efficiently supporting multiple PCI (peripheral component interface) network devices as a wide area connection to a network backbone in a network routing engine.

SUMMARY OF THE INVENTION

The present invention uses a PCI Bus for connecting Network Interface Cards (NICs) to a Hardware Assisted Routing Engine (HARE). Using PCI NICs as the wide area network interface leverages both the reduced cost and flexibility that a commodity PCI adaptor card can provide.

To take advantage of a specific PCI NIC's frame data movement capability, a HARE is provided that interfaces directly with the PCI adaptor's data moving mechanism, whether it is a PCI slave (target) or a PCI master (initiator). Thus, this invention provides a protocol for using a flexible PCI interface design that can be used by HAREs to take full advantage of various PCI NICs.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 2 illustrates DMA descriptor field locations;

FIG. 3 illustrates DMA descriptor field descriptions;

FIG. 6 illustrates further detail of an embodiment of the present invention.

DETAILED DESCRIPTION

Figure 1:
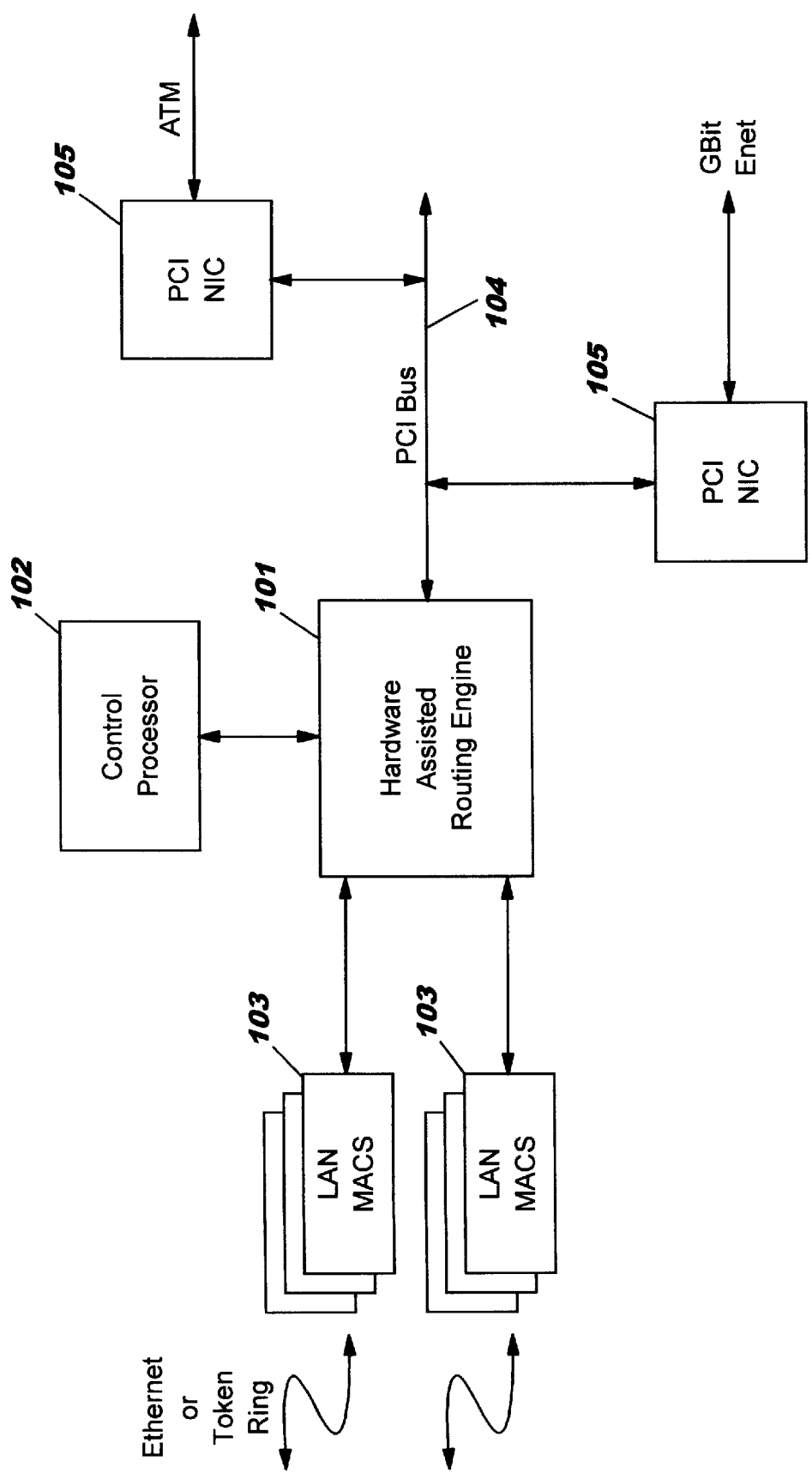
FIG. 1 illustrates an embodiment of the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated an example of the use of the present invention for coupling a LAN network to a WAN network. The LAN network may comprise any well-known means for interconnecting in a network several data processing systems, such as LAN switches, client systems, work stations, or other types of end users within the LAN. Examples of the LAN are an ethernet or a token ring. Connecting the ethernet or token ring to the present invention are a plurality of LAN MACs (media access chips) 103, which handle media level protocols. The LAN MACs 103 couple the LAN to a hardware assisted routing engine (HARE) 101, which provides hardware for routing, under the control of a control processor 102, frames between the LAN and a WAN. The HARE 101 is coupled to the WAN by PCI NICs 105, which are coupled to the HARE 101 by a PCI bus 104. The WAN may be any well-known network for providing a Wide Area Network, such as a ISDN, FDDI or ATM or gigabit (Gbit) ethernet. Herein, WAN may also refer to a backbone network. The WAN will be coupled by a means similar to HARE 101 to another LAN (not shown). The purpose of HARE 101 and the WAN is to permit communication over the WAN between the two LANs.

Referring next to FIG. 6, there is illustrated further detail of the present invention. Shown within HARE 101 is hardware assisted routing engine core logic 603, which is the subject of U.S. patent application Ser. No. 08/997,633 (RA9-97-080), which is hereby incorporated by reference herein. Core logic 603 is coupled to PCI interface 604, which includes transmit 605 and receive 608 sections. When frames are routed from HARE 101 onto PCI bus 104, they are handled by the transmit 605 portion of PCI interface 604, while frames received from PCI bus 104 by HARE 101 are handled by receive section 608 within PCI interface 604. Each of the transmit 605 and receive 608 portions are flexible in order to act as either PCI master or PCI slaves depending upon the configuration of the NIC 105. As further described below, a NIC 105 may be configured to only be a PCI master 601 or a PCI slave 602.

In the instance where a NIC 105 is configured to be the PCI master 601, it will include a master DMA (direct memory access) engine 601 and will interface with the slave memory windows 607 and 610. When a NIC 105 acts as a PCI slave, its memory window 602 will interact with the master DMA engines 606 and 609. The interactions between these devices are described in further detail below.

The PCI interface 604 can be broken down into a frame transmission (frames moving from the HARE 101 to the NIC 105) interface (TX) 605, and a frame reception (frames moving from the NIC 105 to the HARE 101) interface (RX) 608.

Frames can be transmitted from the HARE 101 to the NIC 105 with the HARE 101 being either a PCI master or a PCI slave. A PCI slave mode of frame transmission is provided for flexibility because many NICs work only as PCI masters; however, typically the more efficient means of moving transmit frame data is for the HARE 101 to be the PCI master. Having the owner of the data "push" the data results in a higher performance interface.

The PCI master interface is based on a descriptor driven DMA engine 606. The DMA descriptor is a three word (12 byte) descriptor as illustrated in FIG. 2. There is one DMA channel per output port (there are multiple output ports on HARE 101). This creates an implicit local memory address for the DMA transfers.

Each DMA Descriptor Block (DDB) contains three 32-bit words of data. The DMA Descriptor Field Locations table in FIG. 2 contains the format of information for a single descriptor. This table is followed by the DMA Descriptor Field Descriptions table in FIG. 3 which describes each field within the descriptor words.

The number of descriptor words for a given DMA Descriptor Block fetched into the DMA channel during a descriptor fetch operation is programmable from zero to all three descriptor words. If less than all three descriptor words are going to be fetched, then the words not fetched are statically stored for the particular DMA channel. This feature allows certain parameters such as the Status Update Address (described further below) to be a fixed field, reducing the need to fetch this parameter from the PCI target device. Variable descriptor block sizes reduces the DMA overhead, reduces PCI bus 104 utilization by the HARE 101, and provides a static mechanism to assign descriptor fields that cannot be provided by a target 105. An example of the optimum usage of this feature would be programming the descriptor fetch size to zero, eliminating the descriptor fetch altogether. When the descriptor fetch size is set to zero, all three descriptor words must be statically assigned for the DMA channel.

A unique feature of the DMA engine 606 is the ability to automatically perform a Status Update. A Status Update is a single PCI write to a descriptor specified PCI address after the completion of the frame data move. The status can be either the original system address, or the Length/Termination status word. The status word can be used by a PCI target for notification of the frame's arrival, to learn the completion status of the DMA transfer, and to learn the length of the transmitted frame.

Figures 4, 5:
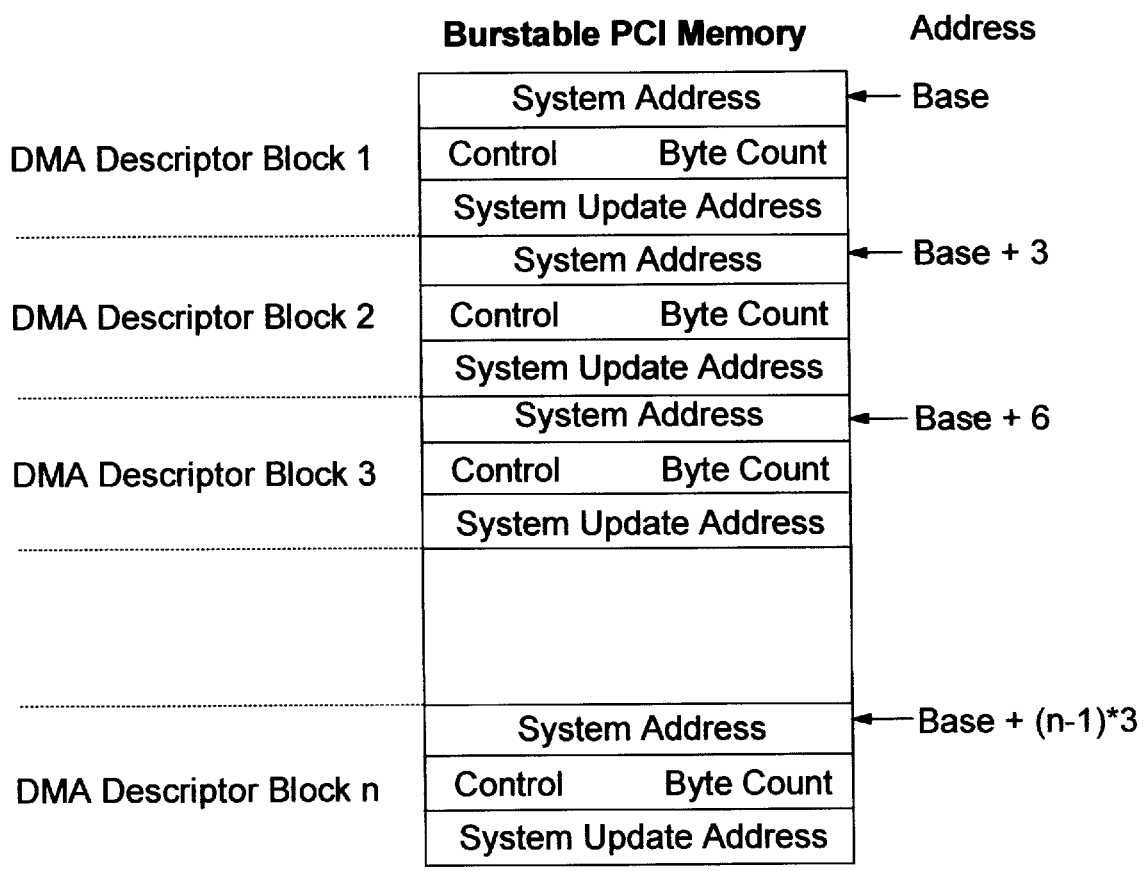
FIG. 4 illustrates a DMA length/termination status word.
FIG. 5 illustrates a DMA descriptor block queue.

The format of the Length/Termination Status word is shown in FIG. 4. Setting the Status Update Type field to b'10' causes the Length/Termination Status word to be written to the PCI address stored in the Status Update Address field of the DDB. Bit 17 of the Length/Termination Status word is set (1) when the DMA completes normally. Bit 16 will be set if an error was detected during the transfer or the frame was aborted for frame DMA operations. The lower 16 bits indicate the length of the DMA transfer performed.

DMA descriptors are stored sequentially in structures called DMA Descriptor Block Queues (DDBQ) as shown in FIG. 5. The DDBQs are located anywhere in PCI memory address space. A DDBQ is available for each DMA channel. Each DDBQ is controlled by five registers (not shown) located in the HARE 101: Base, Max Count, Count, Update Count, and Current. The Base register is the address of the beginning of the queue (DMA Descriptor 1). The Max Count register contains the maximum number of descriptors in the queue and is required to be a power of 2. Count is the number of valid descriptors in the queue and Current is the PCI address of the current DMA descriptor the HARE 101 is processing. The Current pointer wraps back to the Base address when it reaches the value of Base +3* Max Count. To enqueue more descriptors to the queue, the Update Count register for a DMA queue is written with the number of descriptors to be added to the DMA queue.

The DDBQ can run in one of two modes: Normal and Continuous. In Normal mode, the DMA engine 606 only processes descriptors when the count is greater than zero. In Continuous mode, the DMA engine 606 does not decrement the descriptor count after processing the descriptor, and always fetches the next descriptor on the queue. Normal mode operation allows the target device 105 to control the number of frames transmitted by the HARE 101 which is often required by devices with limited buffering. Normal mode queue operation can be thought of as synchronized frame DMA since the target 105 controls the timing of frame delivery from the HARE 101. Continuous mode provides a mechanism for delivering frames by the HARE 101 as soon as they are ready for transmit. Target devices 105 that have large enough buffering, or the capacity to accept several frames back to back (such as Gbit ENET) could run in Continuous mode.

An additional DMA engine feature is the Skip Descriptor Processing command. Whenever the DMA engine 606 fetches a System Address=0×0, it automatically skips the processing of the descriptor, and based on the Skip Descriptor Pacing mechanism, will fetch the next descriptor. This feature is used to allow a target device 105 to run in continuous queue mode, and still be able to control the delivery of transmit frames. In addition to controlling the delivery of transmit frames, skipping of a buffer provides a flexible way for the target device 105 to manage its frame buffers.

The skip descriptor pacing mechanism is a timer mechanism that increases the time between descriptor fetches each time a null system address is encountered to judiciously use PCI bandwidth. For transmit frames, the frame is aborted after a predetermined time-out period. Once a non-zero descriptor is fetched, the timer resets back to immediate fetch.

In slave mode, a PCI master 601 pulls the data from a memory window 607 on the HARE 101 using PCI read transfers.

The PCI slave transmit interface 607 consists of the following resources per TX (Transmit) port:

Shared PCI Slave memory window

Shared Memory Window Address register

Transmit Frame Ready Notification register

Transmit Frame Length register

Optional Transmit Frame Ready interrupt signal.

Transmit Frame Read Complete register

When a frame is ready for transmit, the HARE 101 loads the TX length into the port's TX Frame Length Register and sets the TX Frame Ready bit in the TX Frame Ready Notification Register. If the optional TX Frame Ready interrupt is enabled, an interrupt will be posted onto the PCI bus 104. If the interrupt is not enabled, the PCI master 601 must poll the TX Frame Ready Notification register to determine when a frame is ready for the master to read. The transmit frame data within the HARE 101 is always read starting from the beginning of the shared memory window 607. The PCI master 601 can either read the address of the shared memory window from the Shared Memory Window Address register, or if the PCI master 601 is capable of statically storing the address internally, it may use a pre-defined address. After obtaining the address of the shared memory window 607 for the TX frame's port, the PCI master 601 reads the entire frame data from the memory window 607. At completion of the frame data read, the master 601 can optionally write the Transmit Frame Read Complete Register. If the PCI master 601 does not write the complete register, the HARE 101 automatically assumes that the frame was successfully transmitted if all bytes of the frame were read across the PCI bus 104. If the PCI master 601 writes the TX Frame Read Complete register prior to read all bytes of the frame, the HARE 101 will assume the frame has been aborted by the master 601 and free up the remaining bytes not read by the PCI master 601. If the TX Frame Read Complete write occurs after all bytes of the frame have been read, the HARE 101 assumes successful transmission of the frame, completing the frame transmit sequence for the frame.

Frames can be received by the HARE 101 from the NIC 105 as either a PCI master 609 or as a PCI slave 610. The most efficient means of moving receive frame data is for the HARE 101 to be the PCI slave 610. Having the owner of the data "push" the data results in a higher performance interface. A PCI master mode of frame reception is provided for flexibility since some NICs 105 may function only as PCI slaves 602.

The master interface 609 for frame reception is based on the same descriptor driven DMA engine as the transmit master interface 606. In this case, all the features of the receive DMA engine 609 are the same as those in the transmit DMA engine 608 with exception of the direction of frame movement and the aborting of the frame after a predetermined time-out period. In the receive master case, the DMA engine 609 will read the frame from the address specified in the system address field of the DMA descriptor.

Like the transmit master DMA mechanism 606, the flexibility of the receive master DMA mechanism 609 allows it to be used in many different scenarios for receiving network frames on the PCI bus 104. The standard method for doing this is simply for the NIC 105, or some other device on behalf of the NIC 105, to build a receive DMA Descriptor Block (DDB) for each frame a NIC 105 receives and enqueue the DDB to a DMA Descriptor Block Queue associated with the receive DMA engine 609. When a DDB reaches the front of the queue, the DMA engine 609 will read the entire DDB and process the descriptor.

The option of fetching only part of the DDB, while the remaining fields are statically stored is also available for the receive DMA engine 609. One case where this would be useful is if the control, byte count, and status update words are constant from frame to frame for a given NIC 105. In this case, the descriptor word fetch size would be set to one, and the static fields would be written to their respective values. As frames become available to be received, the system address would be the only field in the DDB required to be written prior to the descriptor being enqueued.

If the NIC 105 provides a method determining the system address of a received frame by reading a pre-defined PCI address, then the previous example could be taken a step further. In this case, one can set the descriptor word fetch size to one, and the static fields would be written to their respective values. Instead of assigning the DDBQ pointers to point to a queue, one would set the queue size to one, and the current pointer to the PCI address that must be read to get the system address of the frame to be received. When the NIC 105 has a frame to be received, it would update the current count of the DDBQ by writing the update count register for the DMA engine 609. This will result in the DMA machine 609 reading the system address from the NIC 105 and then reading the frame. In the event that the NIC 105 has no means of updating the current count, the DMA engine 609 can be placed in continuous mode. This will result in the DMA engine 609 polling the NIC 105 for frame system addresses. The DMA engine 609 will ignore any system addresses of 0x00000000, and read frames from all others.

The slave interface 610 for frame reception is based on the same mechanism as the transmit slave interface 607. In the receive mechanism 610, a PCI master 601 pushes the data into a memory window 610 on the HARE 101 using PCI write transfers.

The PCI slave receive interface 610 consists of the following resources per RX (Receive) port:
  Shared PCI Slave memory window
  Shared Memory Window Address register
  Receive Frame Write Complete register
  Receive Frame Abort Mask register When a NIC 105 with a PCI master interface 601 has a frame that is ready to be received by the HARE 101, the NIC 105 writes the frame data into the shared memory window 610 of the HARE 101. The received frame data within the HARE 101 is always written starting from the beginning of the shared memory window 610. If the PCI master 601 is not capable of statically storing the address of the shared memory window 610, the address can be read from the Shared Memory Window Address Register. At completion of the frame data write, the master 601 must write the Receive Frame Write Complete Register to indicate that the frame is completely received. The Receive Frame Abort Mask register can be used with the Receive Frame Write Complete register to indicate a receive frame abort. The mask register is used to designate if any data written to the Receive Frame Write Complete register can be used to indicate a receive abort. If a mask bit is set, and the corresponding bit in the Receive Frame Write Complete register is written to a one, then the frame will be aborted.

An additional feature of this PCI interface 604 is its ability to support frame movement between multiple HAREs 101 on the same PCI bus 104. In this mode of operation, the HARE 101 with frame data to send is the PCI master, and the HARE 101 that receives the frame data operates as the PCI slave. The DMA engine of the master HARE is set up in continuous mode, and the descriptor word fetch is set up such that no descriptor words are read from the DDBQ, resulting in all the descriptor words being statically assigned. The statically assigned system address in the master is set up to be the Shared PCI Slave memory window of the slave, and the status update address is set up to be the Receive Frame Write Complete register of the slave. When a frame becomes available in the master to transmit, the DMA engine will process the statically assigned descriptor words resulting the in the frame being written to the Shared PCI Slave memory window, and the Receive Frame Write Complete register being written.

Although the present invention and its advantages have been described in detail, it should be understood that various changes, substitutions and alterations can be made herein without departing from the spirit and scope of the invention as defined by the appended claims.

What is claimed is:

1. A system for coupling a first data processing network to a second data processing network comprising:
   a PCI bus;
   a first PCI network interface card ("NIC") coupled to the second network and to the PCI bus; and
   a PCI interface, coupled to the first network, adaptable for operating as a PCI master or a PCI slave depending on whether the first PCI NIC is a PCI master or a PCI slave.

2. The system as recited in claim 1, wherein the PCI interface operates as a PCI master when the first PCI NIC is a PCI slave, and wherein the PCI interface operates as a PCI slave when the first PCI NIC is a PCI master.

3. The system as recited in claim 2, wherein when the PCI interface operates as a PCI master when the first PCI NIC is the PCI slave, data is communicated between a master DMA engine in the PCI interface and a slave memory window in the first PCI NIC.

4. The system as recited in claim 2, wherein when the PCI interface operates as a PCI slave when the first PCI NIC is the PCI master, data is communicated between a master DMA engine in the first PCI NIC and a slave memory window in the PCI interface.

5. The system as recited in claim 2, wherein the first network is a LAN and the second network is a WAN.

6. The system as recited in claim 5, wherein the LAN and the WAN are heterogenous.

7. The system as recited in claim 2, wherein the first and second networks are LANs.

8. The system as recited in claim 5, wherein the WAN is an ethernet.

9. The system as recited in claim 5, wherein the WAN is an ATM network.

10. The system as recited in claim 5, wherein the WAN is a ISDN network.

11. The system as recited in claim 5, wherein the LAN is an ethernet.

12. The system as recited in claim 5, wherein the LAN is a token ring.

13. The system as recited in claim 5, wherein the PCI interface is coupled to the LAN via a hardware assisted routing engine.

14. The system as recited in claim 5, wherein the WAN is a FDDI network.

15. The system as recited in claim 1, wherein the PCI interface is based on a descriptor driven DMA engine using a DMA descriptor block ("DDB"), wherein one or more words of the DDB may have a fixed value.

16. The system as recited in claim 15, wherein the fixed value is an address and/or control value and is statically stored.

17. The system as recited in claim 15, wherein the DDB is stored sequentially in a DDB queue pertaining to the DMA engine.

18. The system as recited in claim 15, wherein the one or more words are programmable.

19. A PCI interface protocol operable for coupling a first data processing network to a second data processing network via a PCI bus and a PCI NIC coupling the second network to the PCI bus, the PCI interface comprising circuitry adaptable for operating as a PCI master or a PCI slave depending on whether the PC NIC is operating as a PCI master or a PCI slave.

20. The PCI interface protocol as recited in claim 19, wherein the PCI interface operates as a PCI master when the PCI NIC is a PCI slave, and wherein the PCI interface operates as a PCI slave when the PCI NIC is a PCI master.

21. The PCI interface protocol as recited in claim 20, wherein when the PCI interface operates as a PCI master when the PCI NIC is the PCI slave, data is communicated between a master DMA engine in the PCI interface and a slave memory window in the PCI NIC.

22. The PCI interface protocol as recited in claim 20, wherein when the PCI interface operates as a PCI slave when the PCI NIC is the PCI master, data is communicated between a master DMA engine in the PCI NIC and a slave memory window in the PCI interface.

23. The PCI interface protocol as recited in claim 20, wherein the first network is a LAN and the second network is a WAN.

24. A method for coupling a first data processing network to a second data processing network comprising the steps of:
   coupling a first PCI network interface card ("NIC") to the second network; and
   coupling a PCI interface to the first network;
   coupling a PCI bus between the first PCI NIC and the PCI interface;
   operating the PCI interface as a PCI master or a PCI slave depending on whether the first PCI NIC is a PCI master or a PCI slave.

25. The method as recited in claim 24, wherein the operating step further comprises the steps of:
   operating the PCI interface as a PCI master when the first PCI NIC is a PCI slave; and
   operating the PCI interface as a PCI slave when the first PCI NIC is a PCI master.

26. The method as recited in claim 25, wherein the step of operating the PCI interface as a PCI master when the first PCI NIC is the PCI slave further comprises the step of communicating data between a master DMA engine in the PCI interface and a slave memory window in the first PCI NIC.

27. The method as recited in claim 25, wherein the step of operating the PCI interface as a PCI slave when the first PCI NIC is the PCI master further comprises the step of communicating data between a master DMA engine in the first PCI NIC and a slave memory window in the PCI interface.

28. The method as recited in claim 27, wherein the first network is a LAN and the second network is a WAN.

29. The method as recited in claim 28, wherein multiple output ports connect the WAN to the PCI interface, wherein there is one DMA channel per output port.

30. The method as recited in claim 24, wherein frame data is transferred to the second network as soon as it is ready for transmit.

31. The method as recited in claim 24, wherein the PCI NIC controls a number of frames transmitted thereto.

* * * * *